May 10, 1955 H. W. COLE, JR., ET AL 2,707,972
WIRE-REENFORCED FLEXIBLE METAL HOSE
Filed July 30, 1951 2 Sheets-Sheet 1
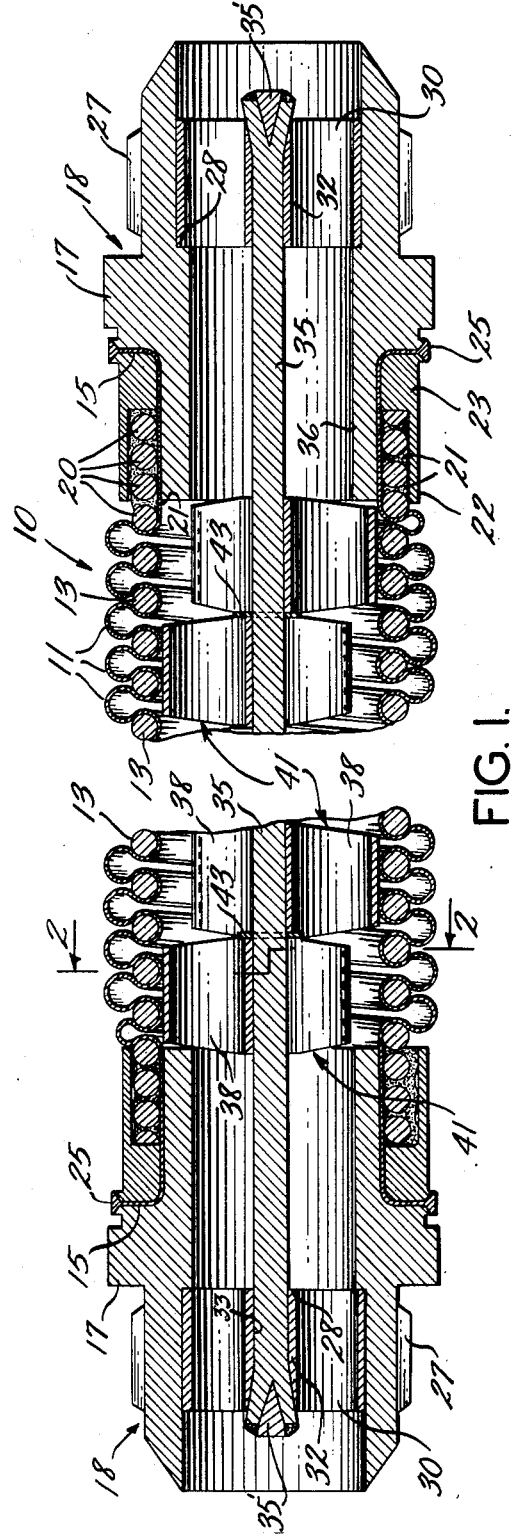
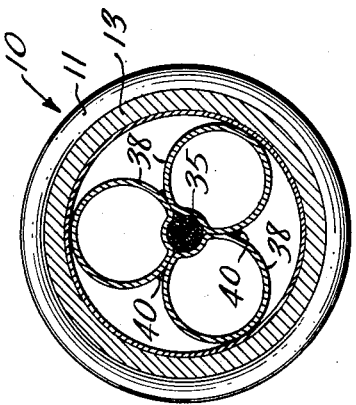
INVENTOR.
Howard W. Cole, Jr.
DELWYN L. OLSON
BY Emery, Varney,
Whittemore & Dix
ATTORNEYS.

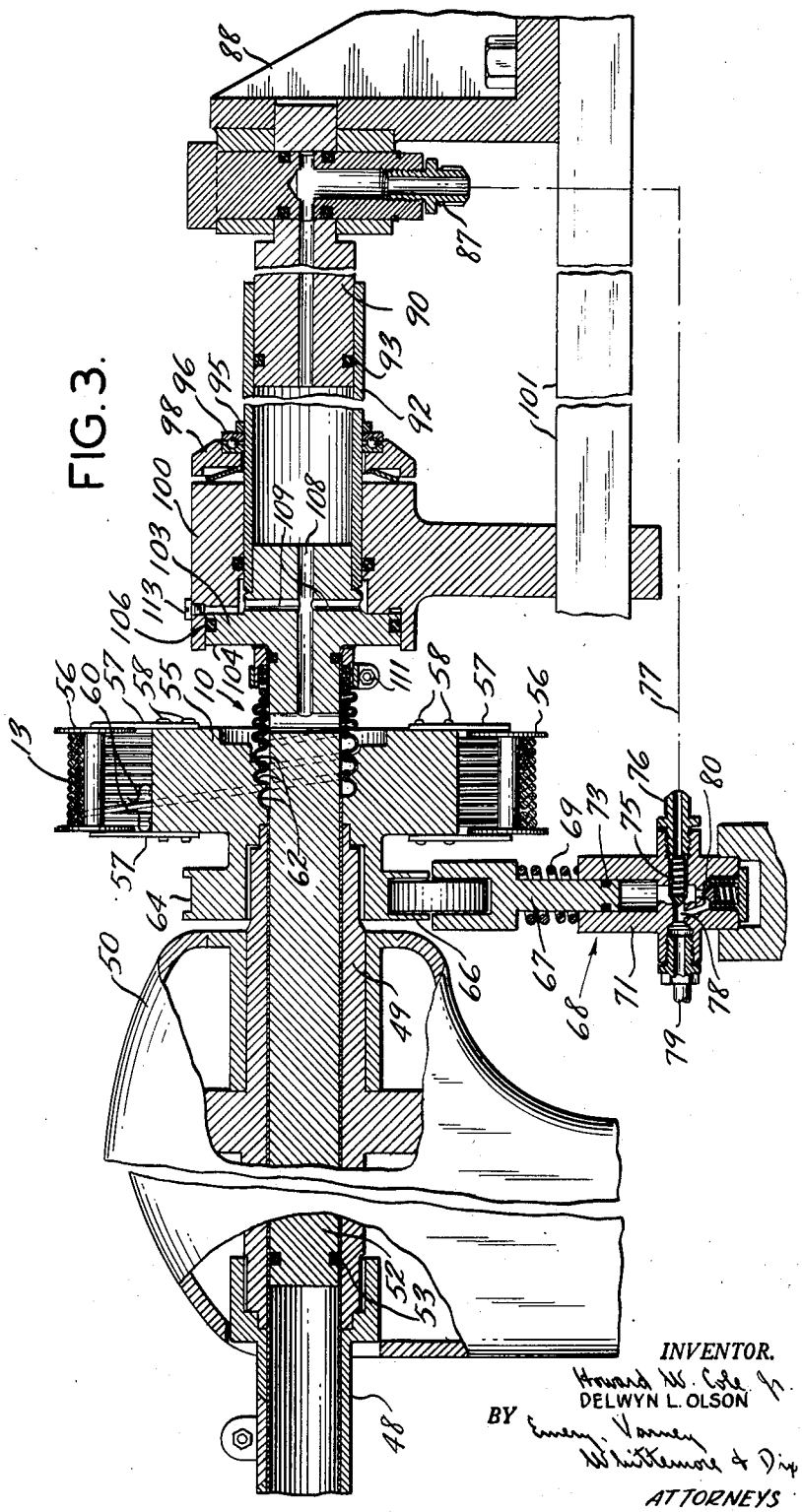

United States Patent Office 2,707,972
Patented May 10, 1955

2,707,972

WIRE-REENFORCED FLEXIBLE METAL HOSE

Howard W. Cole, Jr., and Delwyn L. Olson, Mountain Lakes, N. J., assignors, by mesne assignments, to said Olson Application July 30, 1951, Serial No. 239,206

6 Claims. (Cl. 138—60)

This invention relates to flexible metal hose for use with liquids at very high pressure, and to apparatus and methods for making such hose.

Flexible metal hose must necessarily have a thin wall in order to have flexibility. When the hose is to be used for high internal pressure, special provision must be made to prevent the pressure from damaging or bursting a hose.

It is an object of this invention to provide an improved, flexible hose capable of carrying much higher pressure than comparable hoses of the prior art. This invention increases the strength of the wall by having a continuous wire wrapped around the outside of the hose, along the groove of a helical corrugation, to withstand radial internal pressure, and the hose has a longitudinally extending tension element within it for restraining the hose longitudinally against the force produced by the internal pressure acting over the maximum open, internal cross-sectional area of the hose.

Another object of the invention is to provide an improved flexible metal hose which is simpler in construction, less expensive to manufacture, lighter in weight, and of reduced hydraulic friction.

One feature of the invention relates to the bonding together of a group of juxtaposed convolutions of the wire helix at the ends of the hose to prevent the wire from unwinding when the hose tends to swell in response to high pressure exerted against it radially by the fluid contained in the hose.

The preferred embodiment of the invention has a multistrand wire rope as the tension element, and has end fittings at opposite ends of the hose with special center connections to which the ends of the wire rope are connected.

There are other features of construction including the shape of the end fittings, each with an inner end portion that fits into the hose but with a flange that limits the extent to which the fitting can be inserted into the hose. The end of the hose is flared out at the fitting and clamped against the fitting by the outside wire helix and an outer ring while the tension element holds the flanges of the end fittings against any longitudinal displacement away from the hose. The tension element is held substantially on the neutral axis of the hose by spacers that also serve to reduce the internal friction of the hose.

Another object of the invention is to provide an improved machine for making flexible metal hose of the character described. The apparatus is simple and reliable, and involves only auxiliary equipment that can be added to a conventional lathe. This auxiliary equipment includes a die that replaces or connects with the face plate of the lathe and a hydraulic supply fitting and pump by which liquid is forced into a tube to expand it and force the tube wall to conform to the shape of the die, preferably a helically corrugated contour. The machine wraps the outside wire around the tube as the hose comes from the die. The hydraulic pressure is applied intermittently to permit stripping from the die during the intervals between the recurring pulses of pressure.

Still another object of the invention is to provide an improved method for making flexible metal hose by the application of hydraulic pressure within a tube, preferably a length of seamless tubing from which the hose is to be made. Features of the method relate to the stripping of the hose from the die and the longitudinal advancement of the hose to bring the next adjacent length of the tube blank into position to be operated upon, the advancement coinciding with intermittent releases of the hydraulic pressure.

Other objects, features and advantages of the invention will appear or be pointed out as the description proceeds.

In the drawing, forming a part hereof, in which like reference characters indicate corresponding parts in all the views, Fig. 1 is a longitudinal sectional view through a flexible metal hose embodying the invention, Fig. 2 is a sectional view on the line 2—2 of Fig. 1, Fig. 3 is a sectional view, partly diagrammatic, of apparatus for making the tubing, shown in Figs. 1 and 2.

The hose comprises a corrugated tube 10 having transverse corrugations 11 with grooves between the corrugations. The corrugations 11 are preferably convolutions of a single helical corrugation but multithread helixes can be used, and with some modifications, circumferential corrugations can be employed. The corrugated wall of the tube 10 is preferably seamless, and it is made of a gauge of metal that is thin enough to give the corrugated contour the flexibility required for the service in which the hose is intended to be used.

A reinforcing wire 13 is wrapped around the outside of the tube 10 and lies in grooves adjacent to each of the corrugations 11. This wire is a single, continuous helix in the preferred construction. With a multiple helix, more than one wire is used, and with circumferential grooves, the wire reinforcing consists of rings. The wire 13 resists the radial thrust of the fluid within the hose and prevents high internal pressure from expanding the diameter of the tube by flattening out the corrugations with resulting destruction of the flexibility feature.

The corrugations 11 do not extend all the way to the ends of the tube 10, and the uncorrugated portions of the tube have ends 15 flared outward and lying against the inner faces of flanges 17 of end fittings 18.

Each end of the wire 13 has a number of its end convolutions 20 brought into contact with one another and bonded together by solder 21 or other bonding material. The bonding together of these end convolutions 20 prevents the wire helix from unwrapping or increasing in diameter when subjected to radial pressure from within. Such a pressure is exerted against the wire helix by the walls of the tube 10 when the fluid in the tube tends to thrust the bottoms of the grooves outward.

The bonded-together end convolutions 20 of the wire 13 at each end of the hose, are covered by a skirt 22 of a ring 23 which fits around the tube 10 between the end of the wire and the flared end 15 of the tube. The ring 23 fits against the inner face of the flared tube end 15 opposite to the flange 17; and the tube end 15, flange 17 and ring 23 are secured together by solder 25 or welding or other bonding.

The end fitting 18 has a body portion with threads 27 on the outside of the fitting and a shoulder 28 within the fitting. A partition 30 fits inside the body portion of the fitting 18 and abuts against the shoulder 28. The partition has a center hub 32 with an opening 33 for receiving the end of a tension element, comprising a multi-strand wire cable 35. There are a number of openings through the partition 30 for the flow of the fluid through the fitting. The outer end of the center opening 33 is tapered outwardly and the end of the tension element 35 is spread and filled by a plug 35' so that the tension element cannot be pulled through the center hub toward the inside of the tube.

An inner end extension 36 of the fitting 18 extends into the interior of the uncorrugated end portion of the tube 10. The flange 17 of the end fitting 18 limits the extent to which the fitting can be inserted into the tube 10. In addition to the connection provided by the solder 25, the end fittings 18 are held in place by the tension element 35.

In order to have the tension element 35 exert the most effective influence in resisting changes in the length of the hose, the tension element must lie along the neutral axis of the hose, that is, along the longitudinal axis of the tube 10. This is particularly important when the hose is bent along a curve, because a tension element against the shorter inside arc of a curved hose would not prevent the other side of the hose from becoming permanently stretched with the result that the end fittings will be permanently out of alignment with one another.

The tension element or wire cable 35 is held substantially on the neutral axis of the hose by spacers comprising short length tubes 38. Each of the spacers or tubes 38 has a diameter approximating the radial distance from the wire cable 35 to the inside face of the tube 10. Three spacer tubes 38 are used and they hold each other in place, as indicated in Fig. 2. It is not necessary that they be connected together, though they can be joined by bonding metal 40 to form groups, if it is desirable to connect them in this way for convenient threading on the cable 35. The tubes are distorted to form openings through which the wire cable 35 is free to pass.

Before the end fittings 18 are put on the tube 10, a number of spacer groups 41 are strung on the wire cable 35 with random stacking and with small washers 43 between each group to keep the edges of one group from catching on the edges of another group or overlapping when the hose is flexed in use. The forward and rearward end faces of the spacer tubes 38 converge toward their outer limits. This makes the forward faces of one spacer group diverge from the confronting rearward faces of the next adjacent spacer group. This makes it possible for the wire cable to bend through a substantial arc of curvature before the confronting faces of a spacer group reach such an angular relation that they strike one another and restrain further flexing of the wire cable.

The angle of convergence that is used for the forward and rearward faces of each spacer group depends upon how sharply the hose will have to bend in service, and partly upon the length of the spacer groups. It is evident that shorter and more numerous spacer groups need not provide for as much bending of the cable between each group since there are more places where the cable can flex.

In addition to their function as spacers, the short length tubes 38 also serve to reduce the friction of the fluid through the hose. Most of the fluid flowing through the hose passes through one or the other of the short tubes 38 and because of the smooth walls of the tubes 38 the turbulence that usually occurs in corrugated tubing is reduced.

Fig. 3 shows the apparatus by which the hose of this invention is made, and the method of making it. The seamless tube 10, preferably one of thin wall and stainless steel, is inserted into a supporting tube 48 and through a spindle 49 in the head stock 50 of a lathe. An internal supporting bar 52 is placed in the tube 10, and this supporting bar 52 has an O ring 53 which provides a pressure seal between the outside surface of the supporting bar 52 and the inside surface of the tube 10.

A die 55 is secured to the end of the spindle 49. A plurality of spools 56 are connected around the periphery of the die 55 by brackets 57 and fastening screws 58. The wire 13 is wrapped around the die outside of the spindles of the spools 56. The end of the wire 10 passes through an opening 58 in the die 57; and there is a friction brake 60 comprising two spring pressed abutments in contact with the wire 13 at the upper end of the opening 58.

The center opening in the die 55, through which the tube 10 passes, has side walls with grooves 62 comprising convolutions of a helix. These grooves preferably increase in depth progressively from the portion of the wall where they begin within the die. In the forming of the hose, the walls of the tube 10 are forced into the grooves 62 of the die by hydraulic pressure, in a manner that will be explained.

At the back of the die 55 there is a cam 64, preferably a multi-lobe cam that contacts with a follower 66 at the upper end of a pump rod 67 of a pump 68. This pump rod 67 and the cam follower 66 are urged upward, to maintain the cam follower in contact with the cam 64, by a coil spring 69 surrounding the pump rod 67 and compressed between a shoulder of the pump rod and an end face of a cylinder 71 of the pump 68. A groove in the lower end of the pump rod 67 contains an O ring 73 which seals the cylinder so that the pump rod 67 operates in the cylinder as a packed piston.

From the lower end of the cylinder 71, the oil, or other liquid used, flows through the rearward portion of a hollow check valve 75 and through a fitting 76 and tubing 77 to the portion of the apparatus in which the hydraulic pressure is used.

The check valve 75 commands a passage 78 which communicates with a reservoir containing oil, or other liquid, through a fitting and tubing 79. There is a relief valve 80 at the lower end of the pump 68 for admitting oil from the cylinder 71 to the tubing 79 in the event that the pressure in the apparatus exceeds a predetermined maximum.

The purpose of the pump 68 is to exert a cyclicly recurring pressure on the hydraulic apparatus. As the pump rod 67 comes down, oil is displaced from the cylinder 71 to apply oil pressure to the apparatus; and as the pump rod 67 moves upward, the oil is drawn back from the hydraulic apparatus into the cylinder 71 unless, or until, the pressure from the hydraulic apparatus is so low that the pump rod 67 draws fresh oil from the reservoir through the check valve 75.

The tubing 77 leads to a fitting 87 supported by a tail stock 88 of the lathe. This fitting is connected with a fixed piston 90 extending into the forward end of a hydraulic cylinder 92 and provided with a groove for holding an O ring 93 by which the piston is sealed.

The cylinder 92 is rotatable about its longitudinal axis and it has a collar 95 which provides a shoulder for holding a thrust bearing 96 against one side of a clutch 98.

The cylinder 92, in addition to its rotary movement, is longitudinally movable, and when the cylinder moves toward the headstock, the clutch 98 engages the front face of a frame 100 which comprises a part of the carriage of the lathe. This carriage is movable along the length of the lathe bed 101.

At the end of the internal supporting bar 52, there is a circular flange 103 which fits into a complementary socket 104 in the end of the frame 100. The peripheral face of the flange 103 has a groove that holds an O ring 106 for sealing the apparatus against leakage of oil between the peripheral face of the flange 103 and the wall of the socket 104. The forward end of the internal supporting bar 52 has a portion that fits into the end of the cylinder 92. There is a passage 108 and branch passages 109 through which liquid from the cylinder 92 passes to the face of the flange 103 and to the space between the internal supporting bar 52 and the tube 10.

When the apparatus is to be operated, the attendant turns the head stock spindle by hand through approximately five revolutions to wrap a number of close convolutions of the wire 13 around the tube 10 near the end of the tube. The convolutions of the wire are then soldered together and soldered to the tubing. A clamp 111 is placed around the outside of the soldered convolutions and tightened so that the tube is securely clamped against the supporting bar 52 and turns as a unit with the supporting bar and spindle. Any excess wire in front of the soldered convolutions is cut off and the end of the tube is shaped to fit the end flange by an ordinary lathe-turning operation.

When the apparatus is to be operated, a bleed screw 113 is opened and the pump 68 is operated until the cylinder 91 and other parts of the system are full of liquid. The bleed screw 113 is then tightened and with continued operation of the pump the hydraulic system receives a plurality of impulses with each revolution of the lathe. As the pressure increases, the liquid in the cylinder 92 pushes the end portion of the supporting bar 52 toward the left relieving the pressure of the frame 100 against the clutch 98.

This disengagement of the clutch permits the supporting bar 52 and tube 10 to rotate with the die 55. As the pressure increase continues, the formed convolutions of the tube in front of the die 55 are compressed. It is this compression that produces the rolled-over shape of the convolutions around the wrapped wire. Further increase in pressure, after the walls of the convolutions around the wire have contacted with one another, causes the tube wall within the die 55 to be expanded into the grooves 62.

As the high point of the cam lobe passes and the hydraulic pressure begins to decrease, the wall of the tube, which has been forced into the groove 62, contracts away from the die surface because of the elasticity of the material of the tube. The hydraulic pressure against the end portion of the supporting bar 52 is relieved and the elasticity of the compressed convolutions of the tube pushes the supporting bar 52 toward the right causing the carriage to again engage under considerable pressure with the clutch 98 so that the rotation of the clutch, the cylinder 92 and supporting bar 52 is stopped.

Since the die continues to rotate, the tube is advanced to the right by the screw action of the helical convolutions 62. This thrusts the internal supporting bar 52, carriage frame 100 and cylinder 92 toward the right while the hydraulic pressure is low. With the next application of hydraulic pressure the operation is repeated, and the next successive section of the tube 10 is expanded into the helical grooves 62 of the die.

When the apparatus has operated long enough to move all but a short rearward end of the tube 10 through the die 55, the rearward end of the hose is finished in a manner similar to the way in which the forward end was started. This is done by discontinuing the hydraulic pump and turning the lathe spindle by hand to wrap about five close convolutions of wire around the end portion of the tube. These close convolutions of wire are then soldered to each other and to the tube. They are cut off from the remaining wire 13 and the lathe is operated to shape the rearward end of the tube to fit against the flange fitting which is subsequently applied.

After the formed tube or hose is taken from the lathe, it undergoes a second operation in which the internal wire cable, spacers and end fittings are installed to obtain the finished product shown in Fig. 1.

The preferred embodiment and method of this invention have been described, but changes and modifications can be made and some features can be used alone or in different combinations without departing from the invention as defined in the claims.

What is claimed is:

1. A high pressure, flexible metal hose, comprising a helically corrugated seamless tube, a wire wrapped in a helix around the outside of the tube with the wire lying in the groove between successive convolutions of the helical corrugation, a group of successive convolutions of the wire at each end of the wire and surrounding the end portions of the tube and bonded together to prevent unwrapping of the wire, fittings at the end of the hose with inner end extensions that fit into the end portions of the tube that are surrounded by the bonded-together convolutions of the wire, and a ring covering the end portions of the tube outside of the bonded-together convolutions of the wire.

2. A flexible metal hose for withstanding high internal fluid pressure, said hose including a helically corrugated tube wrapped with a wire which lies in the groove between successive convolutions of the corrugation helix, the wire having a plurality of its endmost convolutions bonded together to prevent the wire from unwrapping in response to substantial fluid pressure against the tube wall from the inside, a fitting at each end of the tube, each fitting having an inner end extension that fits into the end of the tube at the region surrounded by the bonded convolutions of the wire, a tension element extending substantially centrally throughout the longitudinal length of the hose between the fittings, and connections securing the ends of the tension element to the fittings at the corresponding ends of the hose.

3. A metal hose comprising a helically corrugated tube having a continuous wire helix wrapped around the outside of the tube with the wire lying in the groove between the successive convolutions of the helical corrugation, fittings connected to opposite ends of the tube, a flexible tension element extending longitudinally throughout the length of the tube and connected at opposite ends with the fittings, and means for maintaining the tension element substantially on the neutral axis of the tube, said means comprising groups of spacers at longitudinally spaced zones along the tension element, each group of spacers comprising short-length tubes disposed around the flexible tension element in angular spaced relation and connected with one another.

4. The flexible hose described in claim 3, and including end fittings with inner portions that extend into the tube and flanges that abut against the end of the tube to limit the extent to which the fittings can be inserted into the tube, and in which the flexible tension element is a multi-strand cable that extends through a tapered central opening in each end fitting, and means holding the ends of the cable expanded in the tapered openings to lock the ends of the cable in the fittings, the spacer tubes being located in end-to-end relation but with random stacking so that the axes of successive spacer tubes are located at different angular positions around the multi-strand cable.

5. A flexible metal hose comprising a transversely corrugated tube having a fitting at each end, a tension element comprising a multi-strand wire cable connected at its opposite ends with fittings and extending substantially along the neutral axis of the hose, spacers within the tube for holding the wire cable substantially on the neutral axis, said spacers comprising groups of tubes at different angular positions around the wire cable and with the spacers of each group connected together, each group of spacers being located adjacent to the next groups of spacers and having end faces that slope away from the end faces of the next group in a direction toward the wall of the hose so that the hose can be flexed to a predetermined arc of curvature without pushing adjacent groups of spacers away from one another.

6. A hose comprising a flexible corrugated tube, fittings fixed to the ends of said tube, a tension element fixed to said fittings and extending through said tube, and a plurality of fluid flow permitting spacer elements slidably mounted in longitudinally abutting relationship on said tension element and engaging the inner wall of said tube to maintain said tension element centrally thereof, said spacer elements being so formed that the edge of the wall engaging portion of one is spaced from the adjacent edge of the wall engaging portion of an adjoining spacer element to permit flexing of said tube.

(References on following page)

References Cited in the file of this patent

UNITED STATES PATENTS

| | | |
|---|---|---|
| 401,706 | Legat | Apr. 16, 1889 |
| 581,343 | Frank | Apr. 27, 1897 |
| 973,901 | Witzenmann | Oct. 25, 1910 |
| 1,120,267 | Brinkman | Dec. 8, 1914 |
| 1,120,269 | Brinkman | Dec. 8, 1914 |
| 1,326,988 | Sundh | June 6, 1920 |
| 2,028,150 | Grant | Jan. 21, 1936 |
| 2,028,151 | Grant | Jan. 21, 1936 |
| 2,396,059 | Roberts | Mar. 5, 1946 |
| 2,444,988 | Guarnaschelli | July 13, 1948 |
| 2,550,669 | Brickman | May 1, 1951 |
| 2,658,527 | Kaisar | Nov. 10, 1953 |

FOREIGN PATENTS

| | | |
|---|---|---|
| 27,864 | Great Britain | Dec. 17, 1902 |